(12) United States Patent
Pan et al.

(10) Patent No.: US 11,316,160 B2
(45) Date of Patent: Apr. 26, 2022

(54) SUPERCAPACITY LITHIUM ION BATTERY CATHODE MATERIAL, PREPARATION METHOD THEREFOR AND APPLICATION THEREOF

(71) Applicant: PEKING UNIVERSITY SHENZHEN GRADUATE SCHOOL, Shenzhen (CN)

(72) Inventors: Feng Pan, Shenzhen (CN); Yandong Duan, Shenzhen (CN); Bingkai Zhang, Shenzhen (CN); Jiaxin Zheng, Shenzhen (CN); Jiangtao Hu, Shenzhen (CN); Tongchao Liu, Shenzhen (CN); Hua Guo, Shenzhen (CN); Yuan Lin, Shenzhen (CN); Wen Li, Shenzhen (CN); Xiaohe Song, Shenzhen (CN); Zengqing Zhuo, Shenzhen (CN); Yidong Liu, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 545 days.

(21) Appl. No.: 16/097,599

(22) PCT Filed: Apr. 24, 2017

(86) PCT No.: PCT/CN2017/081647
§ 371 (c)(1),
(2) Date: Oct. 29, 2018

(87) PCT Pub. No.: WO2017/186079
PCT Pub. Date: Nov. 2, 2017

(65) Prior Publication Data
US 2020/0328420 A1    Oct. 15, 2020

(30) Foreign Application Priority Data
Apr. 28, 2016  (CN) .......................... 201610280918.5

(51) Int. Cl.
| | | |
|---|---|---|
| *H01M 4/58* | (2010.01) | |
| *H01M 4/505* | (2010.01) | |
| *H01M 4/525* | (2010.01) | |
| *H01M 4/62* | (2006.01) | |
| *H01M 10/0525* | (2010.01) | |
| *H01M 4/02* | (2006.01) | |

(52) U.S. Cl.
CPC ......... *H01M 4/5825* (2013.01); *H01M 4/505* (2013.01); *H01M 4/525* (2013.01); *H01M 4/625* (2013.01); *H01M 10/0525* (2013.01); *H01M 2004/028* (2013.01)

(58) Field of Classification Search
CPC ........... H01M 10/052; H01M 10/0525; H01M 10/0562; H01M 10/0565; H01M 2004/028; H01M 4/131; H01M 4/366; H01M 4/505; H01M 4/525; H01M 4/5825; H01M 4/625
See application file for complete search history.

(56) References Cited

U.S. PATENT DOCUMENTS

| | | | | |
|---|---|---|---|---|
| 2012/0216394 A1* | 8/2012 | Kitaura | ............. | H01M 10/0562 29/623.2 |
| 2013/0183579 A1* | 7/2013 | Kim | .................... | C01G 45/1257 429/206 |
| 2013/0337327 A1* | 12/2013 | Sun | ..................... | H01M 4/1397 429/219 |
| 2014/0106223 A1* | 4/2014 | Xu | ........................ | H01M 4/131 429/220 |
| 2014/0199475 A1* | 7/2014 | Tonegawa | ........... | H01M 4/5825 427/122 |
| 2015/0214543 A1* | 7/2015 | Kim | ........................ | H01M 4/36 429/221 |

FOREIGN PATENT DOCUMENTS

| | | |
|---|---|---|
| CN | 102881902 A | 1/2013 |
| CN | 103151526 A | 6/2013 |

(Continued)

OTHER PUBLICATIONS

H. Wang, W.-D. Zhang, L.-Y. Zhu, M.-C. Chen. Effect of LiFePO4 coating on electrochemical performance of LiCoO2 at high temperature, Solid State Ionics 178, 131-136. (Year: 2007).*
J. G. Kim, B. Son, S. Mukherjee, N. Schuppert, A. Bates, O. Kwon, M. J. Choi, H. Y. Chung, S. Park. A review of lithium and non-lithium based solid state batteries, Journal of Power Sources 282, 299-322. (Year: 2015).*
International Search Report PCT/CN2017/081647 dated Jul. 21, 2017 and its English translation provided by WIPO.

(Continued)

*Primary Examiner* — Carlos Barcena
(74) *Attorney, Agent, or Firm* — Ladas & Parry, LLP (57) ABSTRACT

A supercapacity lithium ion battery cathode material, a preparation method therefor and an application thereof. The supercapacity lithium ion battery cathode material consists of a transition metal-containing lithium ion cathode material and carbon which is coated on the surface of the lithium ion cathode material. The transition metal on the surface of the lithium ion cathode material is coordinated with carbon by means of X—C bonds to form transition metal-X—C chemical bonds, such that carbon stably coats the surface of the cathode material, wherein C is SP3 hybridization and/or SP2 hybridization, and X is at least one selected from among N, O and S. The supercapacity lithium ion battery cathode material connects the lithium ion cathode material and the carbon by means of the transition metal-X—C chemical bonds, and utilizes the transition metal-X—C chemical bonds to repair boundary of lattices on the surface of the cathode material, such that an interface between the lithium ion cathode material and a carbon layer can be optimized, to form an interface that can store Li, thereby increasing the per gram capacity of the cathode material, and laying the foundation for preparing a supercapacity lithium ion battery.

7 Claims, 8 Drawing Sheets

(56) References Cited

FOREIGN PATENT DOCUMENTS

| CN | 103247778 A | 8/2013 |
|---|---|---|
| CN | 104134782 A | 11/2014 |
| CN | 104466163 A | 3/2015 |
| CN | 104993139 A | 10/2015 |
| CN | 105047863 A | 11/2015 |
| CN | 105514344 A | 4/2016 |
| CN | 105514423 A | 4/2016 |
| CN | 105789596 A | 7/2016 |
| JP | 2010-129332 A | 6/2010 |
| WO | 2009/039735 A1 | 4/2009 |

OTHER PUBLICATIONS

Written Opinion of the International Search Authority PCT/CN2017/081647 dated Jul. 21, 2017 and its English translation provided by Google Translate.

International Preliminary Report on Patentability for PCT/CN2017/081647 dated Oct. 30, 2018 with translation from Google Translate.

The First Office Action dated Oct. 27, 2017 in CN application 201610280918.5 with translation from Google Translate.

The Second Office Action dated Jul. 16, 2018 in CN application 201610280918.5 with translation fiom Google Translate.

Yang, Jinglong, Kang, Xiaochun, He, Daping, Zheng Anmin, Pan, Mu and Mu Shichun (2015). Graphene activated 3D-hierarchical flower-like Li 2FeSi04 for high-performance lithium-ion batteriest. *Journal of Materials Chemistry A*, 3 pp. 16567-16573.

Yang, Jinlong, Hu, Lin, Zheng, Jiaxin, He, Daping, Tian, Leilei, Mu, Shichun, and Pah, Feng (2015). Li 2FeSi04 nanorods bonded with graphene for high performance batteriest. *Journal of Materials Chemistry A*, 3,pp. 9601-9608.

Wang, Cong.*Perparation and Electrochemical Properties Modification of $Li_3 V_2(PO_4)_3$ Cathode Materials for Lithium ion Batteries*. Mar. 15, 2016.

Morgan et al., Li Conductivity in $Li_xMPO_4$ (M = Mn, Fe, Co, Ni) Olivine Materials, Electrochem. Solid-State Lett. 2004, vol. 7, Issue 2, pp. A30-A32.

Liu et al., Doping effects of zinc on $LiFePO_4$ cathode material for lithium ion batteries, Electrochemistry Communications 8 (2006) pp. 1553-1557.

Saiful Islam et al., Atomic-Scale Investigation of Defects, Dopants, and Lithium Transport in the $LiFePO_4$ Olivine-Type Battery Material, Chem. Mater. 2005, 17, pp. 5085-5092.

\* cited by examiner

SUPERCAPACITY LITHIUM ION BATTERY CATHODE MATERIAL, PREPARATION METHOD THEREFOR AND APPLICATION THEREOF

CROSS-REFERENCE TO RELATED APPLICATIONS

The present application is the U.S. national phase of PCT Application PCT/CN2017/081647 filed on Apr. 24, 2017 which claims priority to Chinese Patent Application No. 201610280918.5 filed on Apr. 28, 2016, the disclosures of which are hereby incorporated by reference in their entireties.

TECHNICAL FIELD

The present application relates to the field of cathode materials for lithium-ion batteries, and in particular to an ultra-capacity lithium-ion battery cathode material, a preparation method thereof, and a use thereof.

BACKGROUND

The rapidly developing secondary battery industry constitutes an important part of the new energy field. Lithium-ion batteries have received much attention since they were successfully developed, and have begun to find application in electric vehicles, emergency power reserves, energy storage facilities for wind and solar power generation, and automotive auxiliary power supplies, among others. The performance of lithium-ion batteries depends largely on their cathode materials. The lithium-ion battery cathode material is an important factor affecting battery capacity and represents the main technical bottleneck in the development of high-capacity lithium-ion batteries. The cathode materials for existing lithium-ion batteries are mainly $LiCoO_2$, $LiNiO_2$, $LiMnO_2$, $LiMn_2O_4$, $LiFePO_4$, $LiMn_xFe_yPO_4$, $LiNi_{1-x-y}Mn_xCo_yO_2$ (0<x<1, 0<y<1) and $LiNi_{0.5}Mn_{1.5}O_4$, among others.

At present, an important research and development direction of cathode materials for lithium-ion batteries lies in nano-sized cathode materials, which can improve the rapid charge and discharge capacity of batteries. Although nano-sized cathode materials have a large specific surface area, their surface interface in general cannot store lithium, which causes nano-sized cathode materials to have a lower capacity than ordinary cathode materials. And, nano-sized cathode materials have the disadvantages of low tap density and the like.

Moreover, as nano-sized cathode materials have a large specific surface area, there are relatively more side reactions on their surface, for example, $LiMn_{1/3}Ni_{1/3}Co_{1/3}O_2 + 2HF + Li+e^- \rightarrow Li_{1-x}Mn_{1/3}Ni_{1/3}O_2 + LiF + H_2O$, forming polycarbonates, high-molecular hydrocarbons, NiO, $MnCO_3$, $Li_2CO_3$, $Li_xPF_y$, $Li_xPF_yO_z$, $NiF_2$, $CoF_2$, $MnF_2$, etc. These insulating products increase the surface impedance of the materials and affect the diffusion of lithium ions.

Furthermore, due to damage of lattice interface, the larger the specific surface area, the more damaged the lattice interface, which affects the electrochemical performances of the cathode materials. At present, due to their poor intrinsic conductivity, $LiFePO_4$ material commonly used in electric vehicles is generally made to be nano-sized, and the surface of the nano-sized cathode material is coated with carbon. The advantage of carbon coating is that the conductivity of the cathode material can be improved, accelerating electron transport and promoting $Li^+$ diffusion. Especially, in the case of high charge and discharge rates, the possibility that the own structure of the cathode material will be damaged under a large lithium ion flux can be greatly reduced. However, existing carbon coating methods and the resulting composite cathode materials have not yet fundamentally solved the problem of lattice interface damage.

SUMMARY OF THE INVENTION

The present application aims to provide a novel ultra-capacity lithium-ion battery cathode material, a preparation method thereof, and a use thereof.

To this end, the present application adopts the following technical solutions.

An aspect of the present application discloses a cathode material for a super-capacity lithium-ion battery, which is composed of a transition metal-containing lithium-ion cathode material and carbon coated on a surface of the lithium-ion cathode material, wherein the transition metal on the surface of the lithium-ion cathode material coordinates with the carbon via X—C bonds to form transition metal-X—C chemical bonds, such that the carbon is stably coated on the surface of the cathode material, and wherein C is SP3 hybridized and/or SP2 hybridized, and X is at least one of N, O and S. The ultra-capacity lithium-ion battery cathode material of the present application is capable of interfacial lithium storage. That is, lithium ions can be stored at the surface of the ultra-capacity lithium ion cathode material containing the coating layer of the present application.

It should be noted that the key difference between the cathode material for a super-capacity lithium-ion battery of the present application and a conventional carbon-coated lithium ion cathode material is that, in the present application, the transition metal on the surface of the lithium ion cathode material coordinates with the carbon via X—C bonds to form transition metal-XC chemical bonds. Such a structure can repair lattice interface. In contrast, for a general battery cathode material or a conventionally coated lithium-ion cathode material, such as lithium iron phosphate, the surface of lithium iron phosphate is a surface terminated by Li atoms, and there are five oxygen atoms around an Fe atom on the surface, leading to destruction of $FeO_6$ octahedrons. When transition metal-XC chemical bonds are formed, the Fe atoms on the surface of lithium iron phosphate are passivated by the X—C structure, thereby restoring the $FeO_6$ octahedron structure and achieving the effect of repairing lattice interface. The repaired surface is a surface terminated by carbon atoms.

More importantly, the cathode material for an ultra-capacity lithium-ion battery of the present application repairs the lattice boundary of the cathode material by means of the transition metal-X—C chemical bonds, which not only overcomes the defects caused by damage of lattice boundary, but also increases the lithium storage sites. Lithium storage sites can be added on the surface of the channel through which lithium ions enter and exit, and can also be added on the X side of the transition metal-X—C chemical bonds, further increasing the gram capacity of the cathode material. It can be understood that the key of the present application lies in the repair of lattice boundary by the transition metal-X—C chemical bonds. As for the specific type of the transition metal, it may be a transition metal in an existing conventional transition metal oxide lithium ion cathode material, or may otherwise be an unconventional transition metal, and is not specifically limited herein. Similarly, the transition metal-containing lithium ion cathode material may be selected from various conventional or unconventional lithium ion cathode materials, and is not specifically limited herein. Nevertheless, in preferred embodiments of the present application, several conventional transition metals as well as transition metal-containing lithium ion cathode materials are specified.

It should also be noted that, in theory, any group capable of coordinating with a transition metal on the surface of the lithium-ion cathode material to achieve lattice interface repair can be used in the present application, although it has been confirmed by experiments that coordination via O—C bond, N—C bond or S—C bond achieves a better effect. In the case that production cost is not taken into account, or due to some special requirements, two or three of O—C bond, N—C bond and S—C bond may be used at the same time, and no specific limitation is made herein.

Preferably, the transition metal is at least one of Fe, Co, Ni, V, Ti, Mo, Cu, and Mn.

Preferably, the transition metal-containing lithium-ion cathode material is at least one of a phosphate transition metal lithium cathode material, a silicate transition metal lithium cathode material, a borate transition metal lithium cathode material, a fluorinated sulfate transition metal lithium cathode material and a transition metal oxide lithium cathode material; wherein in the phosphate transition metal lithium cathode material, the silicate transition metal lithium cathode material, the borate transition metal lithium cathode material, the fluorinated sulfate transition metal lithium cathode material and the transition metal oxide lithium cathode material, the transition metal is at least one of Fe, Mn, Co, Ni, V, Ti, Mo and Cu; the transition metal oxide lithium cathode material is $Li_{1+y}(M_aZ_bY_c)_{1-y}O_2$ and/or $LiMn_{2-a}M'_aZ'_bO_4$, wherein in the $Li_{1+y}(M_aZ_bY_c)_{1-y}O_2$, M, Z and Y is non-repetitiously selected from one of Ni, Mn, Co, V, Ti, Mo and Cu, $0 \le a \le 1$, $0 \le b \le 1$, $0 \le c \le 1$, and $a+b+c=1$, $0 \le y \le 1$, and in the $LiMn_{2-a}M'_aZ'_bO_4$, M' and Z' is non-repetitiously selected from one of Cr, Co, Ni, Cu, Fe, Mo, Ti and V, $0 \le a' \le 2$, and $0 \le b' \le 2$.

It should be noted that in the phosphate transition metal lithium cathode material, the silicate transition metal lithium cathode material, the borate transition metal lithium cathode material, and the fluorinated sulfate transition metal lithium cathode material, the transition metal is at least one of Fe, Mn, Co, and Ni. In the case of a plurality of transition metals, the elements may be in stoichiometric relationship according to the chemical equation, which is not described in detail herein. Similarly, in $Li_{1+y}(M_aZ_bY_c)_{1-y}O_2$ and $LiMn_{2-a}M'_aZ'_bO_4$, regardless of the value of the respective parameters, the stoichiometric relationship according to the chemical equation must be satisfied.

It should also be noted that the phosphate transition metal lithium cathode material can also be expressed using the general formula $LiM''_{a''}X''_{b''}Y''_{c''}Z_dPO_4$, the silicate transition metal lithium cathode material can also be expressed using the general formula $Li_2M''_{a''}X''_{b''}Y''_{c''}Z_dSiO_4$, the borate transition metal lithium cathode material can also be expressed using the general formula $LiM''_{a''}X''_{b''}Y''_{c''}Z_dBO_3$, and the fluorinated sulfate transition metal lithium cathode material can also be expressed using the general formula $LiM''_{a''}X''_{b''}Y''_{c''}Z_dSO_4F$; wherein, M'', X'', Y'' Z is non-repetitiously selected from Fe, Mn, Co, or Ni, $0 \le a'' \le 1$, $0 \le b'' \le 1$, $0 \le c'' \le 1$, $0 \le d \le 1$, and $a''+b''+c''+d=1$.

Preferably, the transition metal-containing lithium-ion cathode material of the present application is of a core-shell structure, in which the inner core is a cathode active material and the outer shell is lithium iron phosphate. The surface of the lithium iron phosphate outer shell is coated with carbon, and the carbon is stably coated on the surface of the lithium iron phosphate outer shell via the Fe—X—C coordination structure, wherein X is at least one of N, O and S. Preferably, the thickness of the lithium iron phosphate outer shell is 1-100 nm.

It should be noted that because of the lithium iron phosphate outer shell, in which Fe can form coordination bonds with carbon to achieve the interface repair effect according to the present application, the cathode active material may be a general, conventional cathode active material. Therefore, the cathode active material as the inner core does not need to be specifically limited.

Another aspect of the present application discloses a use of the ultra-capacity lithium-ion battery cathode material of the present application in a lithium-ion battery, comprising preparing the ultra-capacity lithium-ion battery cathode material into a cathode particle material of 5 nm to 100 μm, in which the carbon atoms on the surface of the ultra-capacity lithium-ion battery cathode material are connected to each other or at least in slight contact with each other to form a thermally stable, electron-conducting or lithium ion-conducting network structure.

It should be noted that the ultra-capacity lithium-ion battery cathode material of the present application capable of interfacial lithium storage is micro-/nano-sized. If it is directly used as battery cathode material, it tends to disperse unevenly and agglomerate easily due to its polarity, which affects exertion of its function. Therefore, when it is used as battery cathode material, it is generally made into a cathode particle material of 5 nm to 100 μm. In preparing the cathode particle material, the ultra-capacity lithium-ion battery cathode material forms a thermally stable secondary network structure through connection of the carbon atoms coated on the surface thereof. Such structure facilitates conduction of electrons and lithium ions, thus achieving ultra-capacity.

It should also be noted that the cathode particle material of 5 nm to 100 μm in the present application is prepared by spray drying in an embodiment of the present application. Generally, primary particles of 5-150 nm are first prepared, then the primary particles are prepared into secondary particles of 1-100 μm by spray drying. Generally, the cathode are prepared using the secondary particles, although the primary particles can be directly used to prepare the cathode.

Yet another aspect of the present application discloses a super-capacity lithium-ion battery comprising the ultra-capacity lithium-ion battery cathode material of the present application, which can realize interfacial lithium storage, thereby increasing the gram capacity.

Preferably, the method for preparing the super-capacity lithium-ion battery comprises preparing at least one of the ultra-capacity lithium-ion battery cathode material capable of interfacial lithium storage according to the present application into a suspension, and then spray drying the suspension at a temperature of 25-220° C. to form a cathode secondary particle material of 200 nm to 100 m for use to prepare the super-capacity lithium-ion battery.

It should be noted that the ultra-capacity lithium-ion battery cathode material of the present application may be of many types, depending on the specific coordination bond, transition metal, or lithium-ion cathode material coated. In preparing the ultra-capacity lithium-ion battery, one type of the ultra-capacity lithium-ion battery cathode material may be used alone, or a plurality of types of the ultra-capacity lithium-ion battery cathode material may be used in combination. That's why we say "preparing at least one of the ultra-capacity lithium-ion battery cathode material capable of interfacial lithium storage according to the present application into a suspension".

It should also be noted that the cathode secondary particle material of 200 nm to 100 μm is generally prepared by first preparing primary particles of 5-150 nm, and then preparing the primary particles into the secondary particulate material.

Still another aspect of the present application discloses an all-solid lithium battery employing the ultra-capacity lithium-ion battery cathode material of the present application, the anode of the all-solid lithium battery being lithium metal or a lithium alloy.

It can be understood that the super-capacity lithium-ion battery cathode material of the present application is suitable for various lithium batteries, and of course can also be used for preparing an all-solid lithium battery. As for other components and parts of the all-solid lithium battery, reference may be made to existing production processes, and such components and parts are not specifically limited herein.

Preferably, the cathode plate of the all-solid lithium battery of the present application is made of the super-capacity lithium-ion battery cathode material of the present application, a conductive material and a solid electrolyte, the conductive material being at least one of a conductive nanoparticle, a conductive polymer, a conductive nanotube and a conductive nanosheet, and the solid electrolyte being at least one of an inorganic solid electrolyte, an organic solid electrolyte, and an organic/inorganic composite solid electrolyte. The anode of the all-solid lithium battery of the present application is of a carbon-based material, a super-capacity oxide-based material, a sulfide-based material, lithium metal or a lithium alloy.

It should be noted that the conductive nanoparticle, the conductive nanotube and the conductive nanosheet in the present application can all employ existing materials, and the inorganic solid electrolyte, the organic solid electrolyte and the organic/inorganic composite solid electrolyte can also employ existing solid electrolytes. The key of the present application lies in using the super-capacity lithium-ion battery cathode material capable of interfacial lithium storage according to the present application, the conductive material and the solid electrolyte to prepare the electrode plate.

As for the specific conductive nanoparticle, conductive nanotube, conductive nanosheet, inorganic solid electrolyte, organic solid electrolyte, or organic/inorganic composite solid electrolyte, a material conventionally used in production and testing can be employed.

In addition, the separator of the all-solid lithium battery may also be an inorganic ceramic film, an organic separator, or a composite separator of inorganic ceramic separator and organic separator.

A further aspect of the present application discloses a method for preparing the super-capacity lithium-ion battery cathode material of the present application, comprising preparing an oxygen-containing, sulfur-containing or nitrogen-containing carbon source into a carbon source solution, mixing a transition metal-containing nano-sized lithium ion cathode material with the carbon source solution, milling the resulting mixture in a ball mill until the solvent completely volatilizes, heating the dried product obtained after solvent volatilization to a temperature in the range of 500-800° C. under an inert atmosphere and keeping the product at the constant temperature for 2-12 hours, followed by natural cooling to obtain the super-capacity lithium-ion battery cathode material having O—C bonds, S—C bonds or N—C bonds.

It should be noted that the key of the present application lies in that the mixture of the transition metal-containing nano-sized lithium ion cathode material and the carbon source solution is milled in a ball mill to dryness, which facilitates formation of transition metal-X—C chemical bonds, thereby achieving the effect of repairing lattice boundary. As for the environment of ball milling, it may be a room temperature environment, or may be a certain temperature or a vacuum environment. The ball milling temperature is generally that which is obtained by appropriate heating on the basis of room temperature, for example heating to less than 100° C., and is not specifically limited herein. An oxygen-containing carbon source condition yields transition metal-O—C chemical bonds, a sulfur-containing carbon source condition yields transition metal-S—C chemical bonds, and a nitrogen-containing carbon source condition yields transition metal-N—C chemical bonds. In preferred embodiments of the present application, under a sulfur-containing or nitrogen-containing condition, the ball milling is carried out under vacuum conditions in which oxygen is excluded.

Preferably, the oxygen-containing carbon source is at least one of citric acid, glucose and sucrose, the sulfur-containing carbon source is thiol and/or thiophene, the nitrogen-containing carbon source is an amino acid and/or melamine; and the concentration of the carbon source solution is 0.1-2 mol/L. Preferably, the solvent of the carbon source solution is at least one of water, isopropyl alcohol, ethanol, acetone, and ethylene glycol.

Preferably, the inert atmosphere is nitrogen or argon.

The present application has the advantages as follows:

The super-capacity lithium-ion battery cathode material of the present application is capable of interfacial lithium storage. Through connection of the transition metal-containing lithium ion cathode material and carbon by means of transition metal-X—C chemical bonds, and use of the transition metal-XC chemical bonds to repair the lattice boundary of the cathode material, the interface between the lithium-ion cathode material and the carbon layer is optimized, forming an interface capable of storing Li. The additional lithium storage sites include lithium storage sites added on the surface of the channel through which lithium ions enter and exit, and also lithium storage sites added on the X side of the transition metal-X—C chemical bonds, further increasing the gram capacity of the cathode material, which lays a foundation for the preparation of a super-capacity lithium-ion battery.

DETAILED DESCRIPTION OF THE INVENTION

In the prior art, there are also related studies on carbon-coated lithium-ion cathode materials. In studying carbon-coated lithium-ion cathode materials, the inventors of the present application found that the capacity of the carbon-coated $LiFePO_4$ lithium-ion cathode materials prepared by the inventors increased to various degrees, and the battery capacity of the lithium-ion batteries prepared using these carbon-coated lithium ion cathode materials reached 200 $mAhg^{-1}$ or higher, exceeding the theoretical capacity of $LiFePO_4$ of 170 $mAhg^{-1}$. With such new discoveries, the inventors of the present application conducted intensive studies on carbon-coated lithium-ion cathode materials, and found that when a transition metal-containing lithium-ion cathode material was carbon coated, the transition metal on the surface of the lithium-ion cathode material coordinated with carbon via O—C bonds, forming transition metal-O—C chemical bonds. Such a structure can repair the damaged lattice interface of the cathode material. It was confirmed by calculation based on the first principle of quantum chemistry that a Fe atom on the surface of lithium iron phosphate was surrounded by five oxygen atoms, representing a damaged $FeO_5$ octahedron, such that the surface of the channel through which lithium ions enter and exit cannot store lithium. The calculated lithium storage voltage was −0.13V, so lithium cannot be stored. When a super-capacity interface capable of lithium storage was formed, that is, when transition Fe—O—C bonds were formed, the Fe atoms on the surface of lithium iron phosphate were passivated by the O—C structure, thus restoring the $FeO_6$ octahedron structure. As a result, the lithium storage sites increased on the surface included those on the surface of the channel through which lithium ions enter and exit, with a lithium storage voltage of around 3.2V, which was slightly lower than the bulk voltage by about 0.1-0.2 V, and also included those on the 0 side of the transition Fe—O—C chemical bonds, with a voltage of around 2.6 V, thus increasing the gram capacity of the effective lithium storage of the cathode material. Based on such findings, the formation and the preparation method of transition metal-O—C chemical bonds were further studied, resulting in the ultra-capacity lithium-ion battery and a preparation method thereof according to the present application.

On this basis, the transition metal-O—C chemical bonds were further studied, and it was found that in addition to the O—C bond coordination, N—C bond coordination and S—C bond coordination can also achieve an equivalent effect. Therefore, a carbon-coated super-capacity lithium-ion battery cathode material formed via transition metal-X—C chemical bonds is proposed in the present application, wherein X is N, O or S.

The present application is further described in detail below by way of specific examples, which are only intended to further illustrate the present application and are not to be construed as limiting the present application thereto.

Example 1

In this example, a conventional carbon-coated cathode material, and a carbon-coated super-capacity lithium-ion battery cathode material with transition metal-O—C chemical bonds to repair lattice interface, were respectively prepared.

Conventional carbon-coated cathode material: 1 g of lithium iron phosphate having an average particle diameter of 83 nm, 0.2 g of glucose, and 5 ml of ethanol as dispersant were mixed, and the mixture was conventionally heated and dried. The resulting product was heated to 650° C. and kept at the constant temperature for 4 hours under an argon atmosphere, followed by natural cooling to obtain the LiFePO$_4$/C composite material.

Super-capacity lithium-ion battery cathode material: 1 g of lithium iron phosphate having an average particle diameter of 83 nm, 0.2 g of glucose and 10 mL of ethanol as dispersant were mixed, and the mixture was placed in a ball mill, and ball-milled into a nano-sized slurry at a rotation speed of the ball mill of 350 rpm. The slurry was ball milled for about 10 hours to dryness, when the ethanol dispersant completely volatilized. The resulting product was heated to 650° C. and kept at the constant temperature for 4 hours under an argon atmosphere, followed by natural cooling to obtain the super-capacity lithium-ion battery cathode material in this example.

Figure 4:
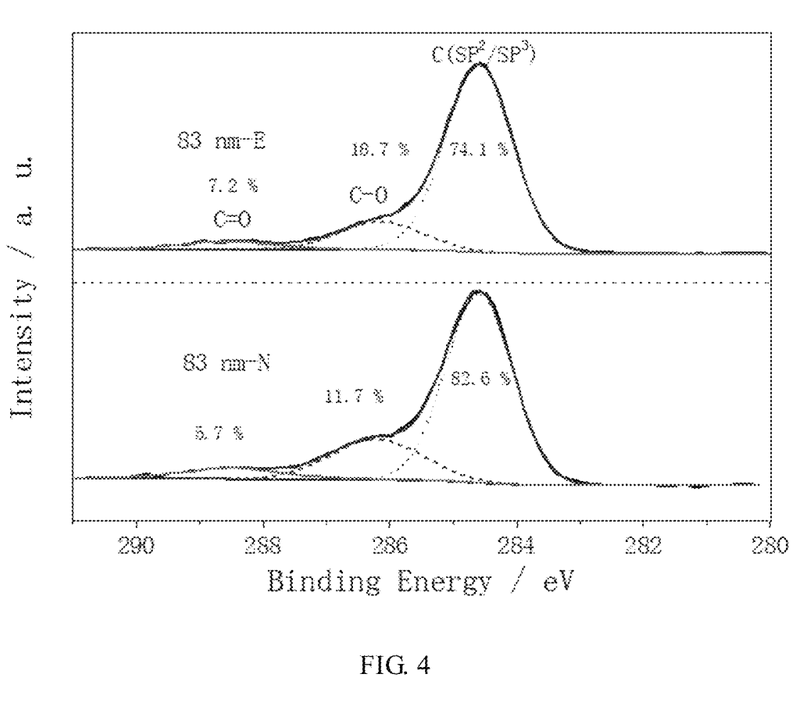
FIG. 4 is a graph showing the X-ray photoelectron spectroscopy spectrums of the conventional carbon-coated lithium-ion battery cathode material 83 nm-N and the super-capacity lithium-ion battery cathode material 83 nm-E prepared in an embodiment of the present application, wherein the upper panel shows the X-ray photoelectron spectroscopy spectrum of the super-capacity lithium-ion battery cathode material 83 nm-E and the lower panel shows the X-ray photoelectron spectroscopy spectrum of the conventional carbon-coated lithium-ion battery cathode material 83 nm-N.

The interface between LiFePO$_4$ and the carbon layer was tested by X-ray photoelectron spectroscopy. The results are shown in FIG. 4. It can be seen that there were more C—O bonds in the ultra-capacity lithium-ion battery cathode material in this example, confirming that a new interface was formed between LiFePO$_4$ and the carbon layer, while no new interface was formed in the conventional carbon-coated cathode material.

Figure 5:
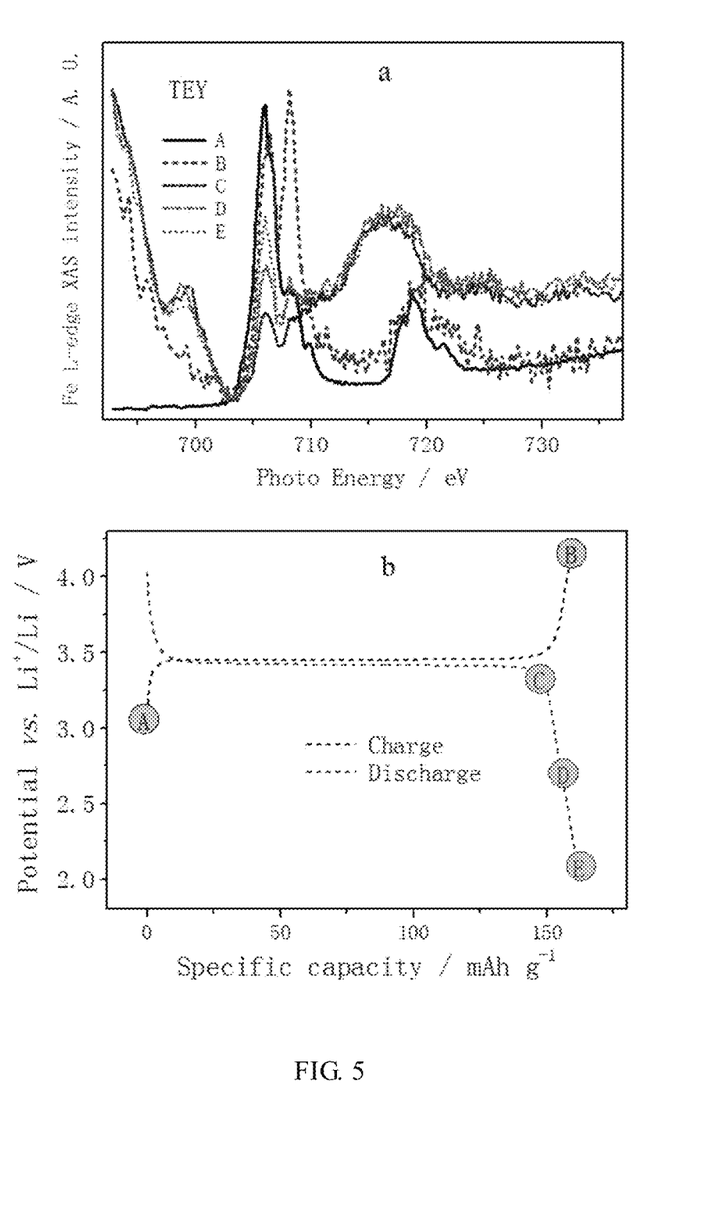
FIG. 5 is a graph showing the soft X-ray test results, under different SOCs, of the conventional carbon-coated lithium-ion battery cathode material 83 nm-N prepared in an embodiment of the present invention, wherein panel a shows the K-side soft X-ray absorption spectrum of Fe element under different SOCs, and panel b shows the different SOC marker points corresponding to panel a, and wherein A, B C, D, and F in the graph are respectively different SOC markers.
Figure 6:
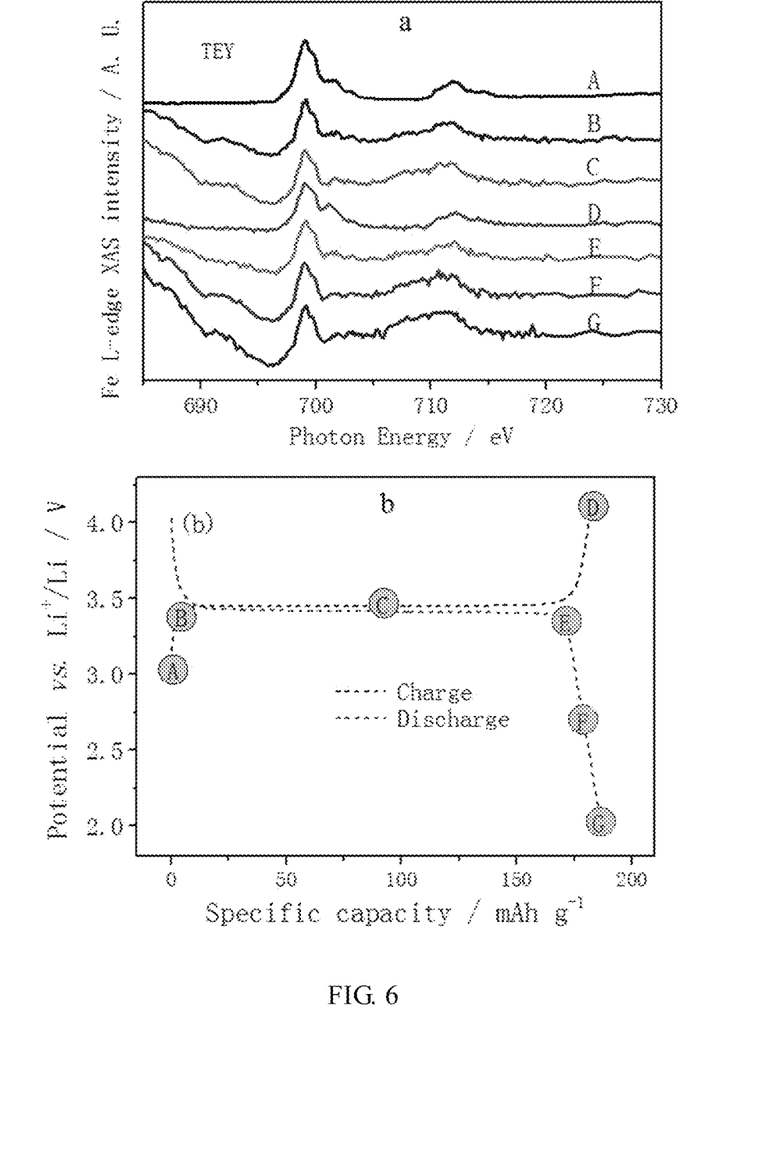
FIG. 6 is a graph showing the soft X-ray test results, under different SOCs, of the super-capacity lithium-ion battery cathode material 83 nm-E prepared in an embodiment of the present invention, wherein panel a shows the K-side soft X-ray absorption spectrum of Fe element under different SOCs, and panel b shows the different SOC marker points corresponding to panel a, and wherein A, B, C, D, E, F, and G in the graph are respectively different SOC markers.

The conventional carbon-coated cathode material and the ultra-capacity lithium-ion battery cathode material prepared in this example were respectively assembled into a battery, and the resulting batteries were respectively charged and discharged to the SOC marked in FIG. 5 and FIG. 6b.

The battery was disassembled in a glove box. The cathode plate was washed with dimethyl carbonate, transferred to a soft X-ray test device, and tested for the synchrotron radiation soft X-ray absorption spectrum. When assembling the super-capacity lithium-ion battery, the lithium-ion battery cathode material prepared in this example was prepared into a suspension, and then spray-dried at 100° C. to prepare composite cathode particles having an average particle diameter of 12 μm for preparing the lithium-ion battery; the cathode plate was prepared by preparing a slurry from the composite cathode particles having an average particle diameter of 12 m, acetylene black and PVDF, and coating the slurry onto an Al foil, the anode plate was a lithium plate, and the assembling of the lithium-ion battery was made according to a conventional manner, which is not described in detail here. When assembling the battery with the conventional carbon-coated cathode material, a slurry was prepared from the conventional carbon-coated cathode material, acetylene black and PVDF, and the slurry was coated onto an Al foil, the anode plate also employed a lithium plate, and the battery was assembled using the same method. Then, the two batteries were tested for the synchrotron radiation soft X-ray absorption spectrum under different SOCs.

The test results are shown in FIGS. 5 and 6. FIG. 5 shows the soft X-ray test results, under different SOCs, of the battery assembled using the conventional carbon-coated cathode material, wherein panel a shows the K-side soft X-ray absorption spectrum of Fe element under different SOCs, and panel b shows the different SOC mark points corresponding to panel a. FIG. 6 shows the soft X-ray test results, under different SOCs, of the battery assembled using the ultra-capacity lithium-ion battery cathode material, wherein panel a shows the K-side soft X-ray absorption spectrum of Fe element under different SOCs, and panel b shows the different SOC mark points corresponding to panel a. It can be seen from FIG. 6 that Fe always exhibited +2 valency, indicating formation of Fe—O covalent bonds, while the results in FIG. 5 show that Fe exhibited +3 valency after delithiation of LiFePO$_4$, indicating that no Fe—O covalent bonds were formed.

Figure 7:
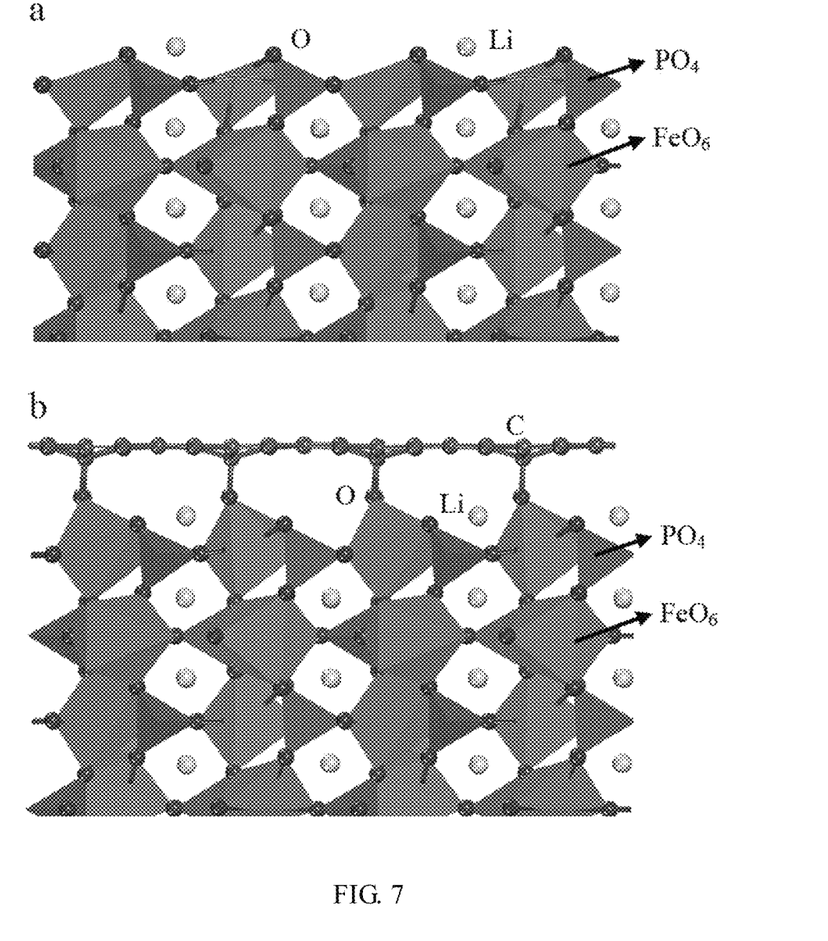
FIG. 7 is a schematic structural view showing the structure of the $LiFePO_4$ lattice before and after repair in an embodiment of the present application, wherein panel a is a schematic view of the structure before repair, and panel b is a schematic view of the structure after repair, wherein O represents oxygen, C represents carbon, and Li represents lithium ion.

Structural simulation of the ultra-capacity lithium-ion battery cathode material of this example was performed, as shown in FIG. 7, wherein panel a is a schematic diagram of the lattice interface structure when no transition metal-O—C chemical bonds were formed, and panel b is a schematic diagram of the lattice interface structure when transition metal-O—C chemical bonds were formed in the ultra-capacity lithium-ion battery cathode material. It can be seen that in the absence of the transition metal-O—C chemical bonds, the FeO$_6$ octahedron was incomplete and exhibited a damaged lattice interface, as shown in FIG. 7 panel a; and when transition metal-OC chemical bonds were formed, the Fe atom on the surface of lithium iron phosphate was passivated by the O—C structure, thereby restoring the structure of the FeO$_6$ octahedron, as shown in FIG. 7 panel b, which would fundamentally solve the problem of lattice interface damage.

Figure 1:
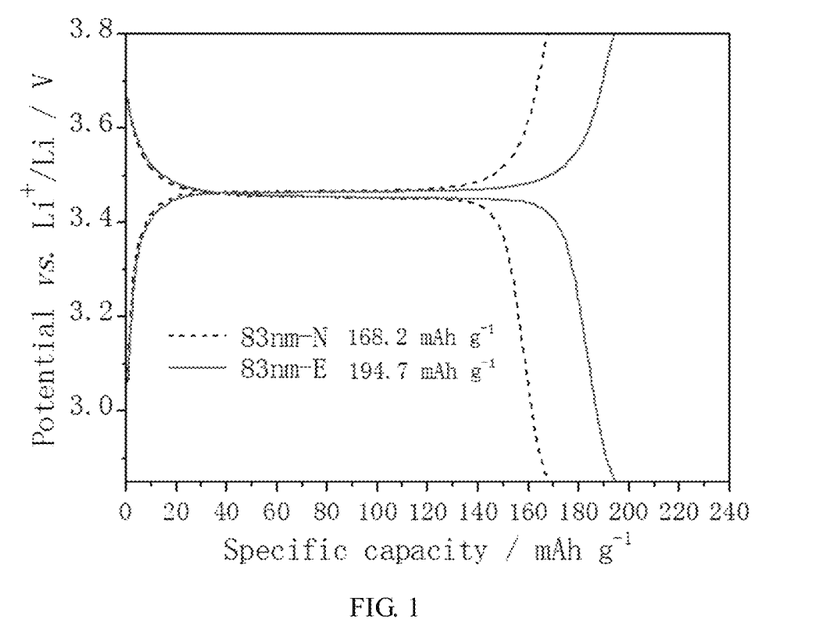
FIG. 1 is a graph showing the charging and discharging curves of a conventional carbon-coated lithium-ion battery cathode material 83 nm-N and a C—O bond-coordinated carbon-coated super-capacity lithium-ion battery cathode material 83 nm-E prepared in an embodiment of the present application, wherein the dotted line represents the charging and discharging curves of the conventional carbon-coated lithium-ion battery cathode material, with a capacity of 168.2 mAh/g, and the solid line represents the charging and discharging curves of the super-capacity lithium-ion battery cathode material, with a capacity is 194.7 mAh/g.
Figure 2:
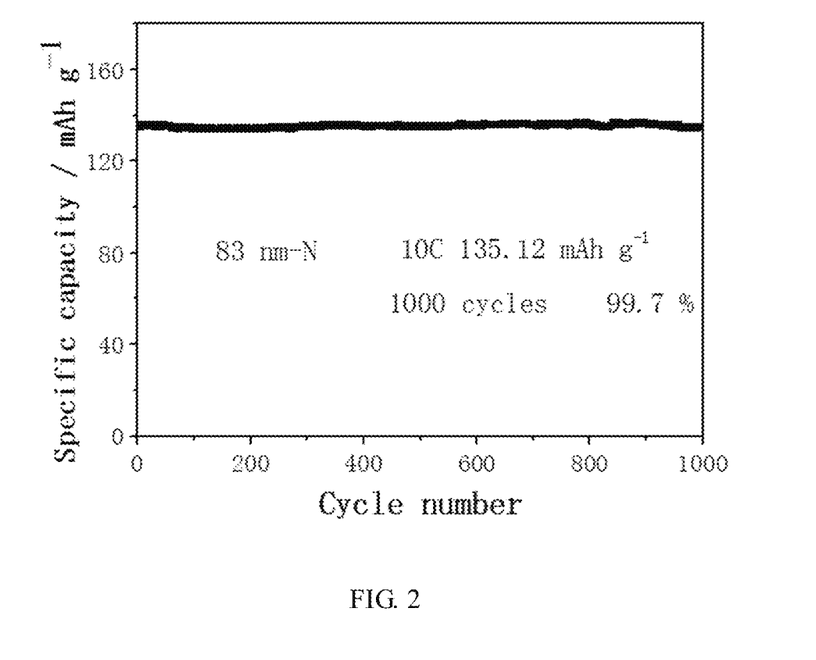
FIG. 2 is a graph showing the 1000-cycle cycling curve of the conventional carbon-coated lithium-ion battery cathode material 83 nm-N prepared in an embodiment of the present application, the figures in the graph indicating that a battery prepared from the conventional carbon-coated lithium-ion battery cathode material having an average particle diameter of 83 nm had a capacity retention rate of 99.7% after 1000 cycles at 10 C 135.12 mAh/g.
Figure 3:
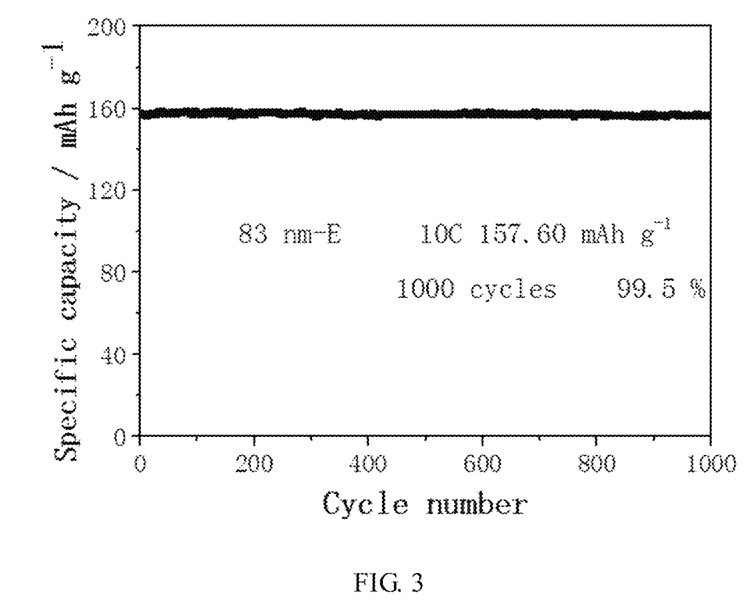
FIG. 3 is a graph showing the 1000-cycle cycling curve of the super-capacity lithium-ion battery cathode material 83 nm-E prepared in an embodiment of the present application, the figures in the graph indicating that a battery prepared from the super-capacity lithium-ion battery cathode material having an average particle diameter of 83 nm had a capacity retention rate of 99.5% after 1000 cycles at 10 C 157.60 mAh/g.

The lithium-ion batteries in this example were tested for battery capacity and 1000-cycle cycling performance using the Maccor M4200 battery test system in the voltage range of 2.85V-3.8V. The test results are respectively shown in FIG. 1, FIG. 2 and FIG. 3. FIG. 1 is a graph showing the charging and discharging curves, from which it can be seen that the battery prepared using the conventional carbon-coated cathode material had a capacity of 168.2 mAh g$^{-1}$, and the battery prepared using the super-capacity lithium-ion battery cathode material had a capacity of 194.7 mAh g$^{-1}$. FIG. 2 and FIG. 3 are graphs showing the 1000-cycle cycling curves. In particular, FIG. 2 is a graph showing the 1000-cycle cycling curve of the battery prepared using the conventional carbon-coated cathode material, and FIG. 3 is a graph showing the 1000-cycle cycling curve of the battery prepared using the super-capacity lithium-ion battery cathode material. It can be seen from the figures that the battery prepared using the conventional carbon-coated cathode material and the battery prepared using the super-capacity lithium-ion battery cathode material both had a very good cycling performance, with a battery capacity retention rate of still up to 99% or more after cycling for 1000 cycles.

Example 2

To prepare the super-capacity lithium-ion battery cathode material in this example, 1 g of $LiFePO_4$ having an average particle diameter of 42 nm and 0.3 g of melamine as a nitrogen-containing carbon source were dispersed in 10 mL of ethanol. The resulting mixture was ball-milled to dryness under nitrogen, and then heated to 750° C. and kept at the constant temperature for 6 hours under an inert atmosphere to obtain the super-capacity lithium-ion battery cathode material in this example.

Figure 8:
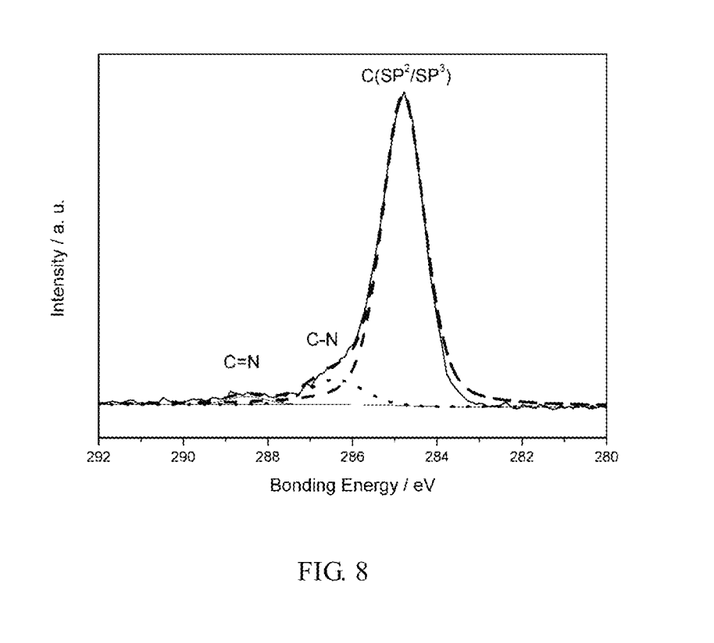
FIG. 8 is an X-ray photoelectron spectroscopy spectrum showing generation of C—N bond in the super-capacity carbon-coated lithium-ion battery cathode material 42 nm $LiFePO_4$ material prepared in an embodiment of the present application.

The interface between $LiFePO_4$ and the carbon layer was tested by X-ray photoelectron spectroscopy. The test results are shown in FIG. 8. The X-ray photoelectron spectroscopy indicated the formation of C—N bonds, confirming that a new interface, that is, a repaired lattice interface, was formed between $LiFePO_4$ and the carbon layer in this example.

Figure 9:
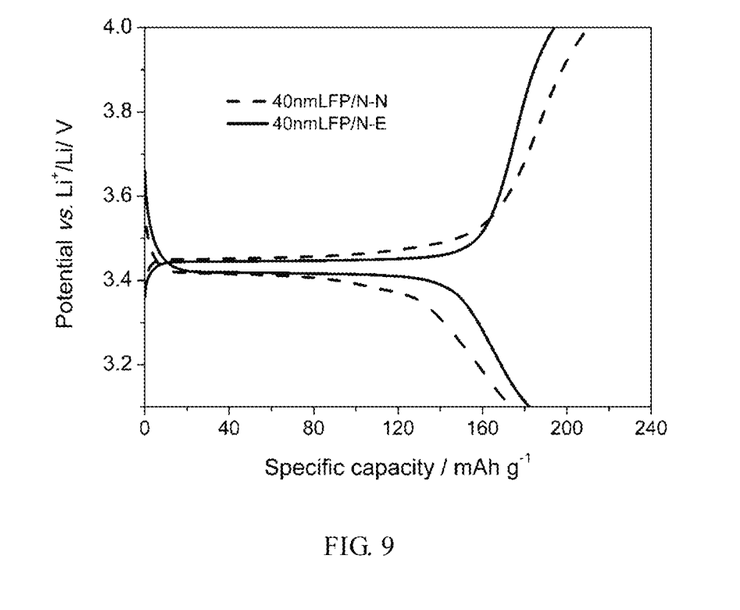
FIG. 9 is a graph showing the charging and discharging curves of a conventional carbon-coated lithium-ion battery cathode material $LiFePO_4$ and a C—N bond-coordinated carbon-coated super-capacity lithium-ion battery cathode material prepared in an embodiment of the present application, wherein the dotted line represents the charging and discharging curves of the conventional carbon-coated lithium-ion battery cathode material, with a capacity of 176.7 mAh/g, and the solid line represents the charging and discharging curves of the super-capacity lithium-ion battery cathode material, with a capacity is 186.1 mAh/g.

Likewise, the ultra-capacity lithium-ion battery cathode material in this example was assembled into a battery, and the battery was tested by the Maccor M4200 battery test system. The assembling and the test method of the battery were the same as in Example 1, and are not described in detail here. As shown in FIG. 9, the test results indicated that the battery assembled using the ultra-capacity lithium-ion battery cathode material in this example had a battery capacity of 186.1 $mAhg^{-1}$.

Example 3

To prepare the super-capacity lithium-ion battery cathode material in this example, 1 g of $LiFePO_4$ having an average particle diameter of 42 nm and 0.2 g of thiophene as a sulfur-containing carbon source were dispersed in 8 mL of ethanol. The resulting mixture was ball-milled to dryness under nitrogen, and then heated to 850° C. and kept at the constant temperature for 12 hours under an inert atmosphere to obtain the super-capacity lithium-ion battery cathode material in this example.

Figure 10:
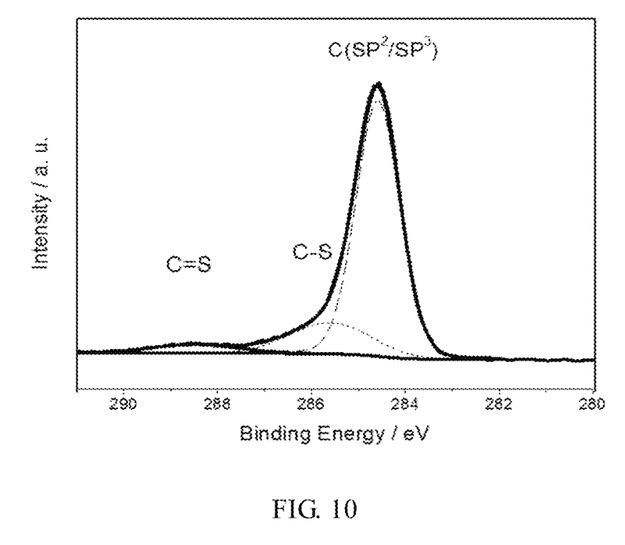
FIG. 10 is an X-ray photoelectron spectroscopy spectrum showing generation of C—S bond in the super-capacity carbon-coated lithium-ion battery cathode material 42 nm $LiFePO_4$ material prepared in an embodiment of the present application.

The interface between $LiFePO_4$ and the carbon layer was tested by X-ray photoelectron spectroscopy. The test results are shown in FIG. 10. The X-ray photoelectron spectroscopy indicated the formation of C—S bonds, confirming that a new interface, that is, a repaired lattice interface, was formed between $LiFePO_4$ and the carbon layer in this example.

Figure 11:
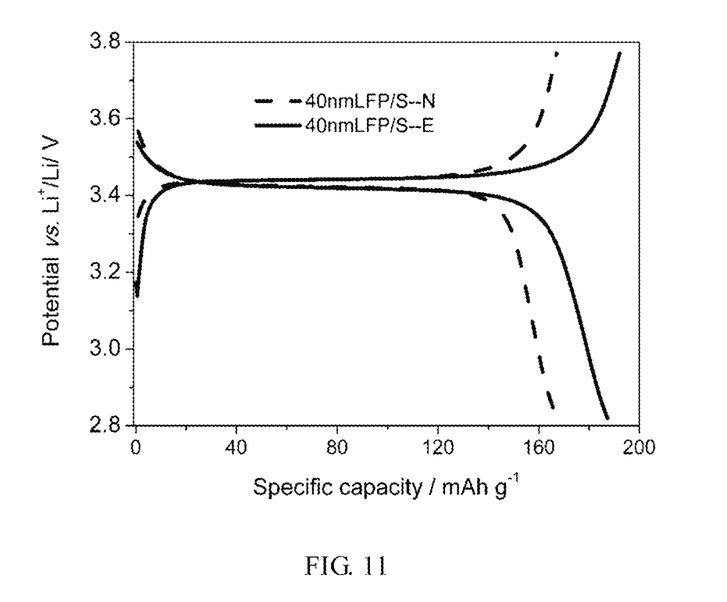
FIG. 11 is a graph showing the charging and discharging curves of a conventional carbon-coated lithium-ion battery cathode material $LiFePO_4$ and a C—S bond-coordinated carbon-coated super-capacity lithium-ion battery cathode material prepared in an embodiment of the present application, wherein the dotted line represents the charging and discharging curves of the conventional carbon-coated lithium-ion battery cathode material, with a capacity of 167.5 mAh/g, and the solid line represents the charging and discharging curves of the super-capacity lithium-ion battery cathode material, with a capacity is 187.3 mAh/g.

Likewise, the ultra-capacity lithium-ion battery cathode material in this example was assembled into a battery, and the battery was tested by the Maccor M4200 battery test system. The assembling and the test method of the battery were the same as in Example 1, and are not described in detail here. As shown in FIG. 11, the test results indicated that the battery assembled using the ultra-capacity lithium-ion battery cathode material in this example had a battery capacity of 187.3 $mAhg^{-1}$.

Example 4

To prepare the super-capacity lithium-ion battery cathode material in this example, nano-sized $LiMn_2O_4$ was used to replace the nano-sized lithium iron phosphate in Example 1. The nano-sized $LiMn_2O_4$ and sucrose were dispersed in ethanol. The resulting mixture was likewise ball-milled to dryness, and then heated to 650° C. and kept at the constant temperature for 10 hours under an inert atmosphere to obtain the super-capacity lithium-ion battery cathode material in this example.

The interface between $LiMn_2O_4$ and the carbon layer was tested by X-ray photoelectron spectroscopy. The X-ray photoelectron spectroscopy indicated the formation of C—O bonds, confirming that a new interface, that is, a repaired lattice interface, was formed between $LiMn_2O_4$ and the carbon layer in this example.

The ultra-capacity lithium-ion battery cathode material in this example was assembled into a battery, and the battery was tested by the Maccor M4200 battery test system. The assembling and the test method of the battery were the same as in Example 1, and are not described in detail here. The test results indicated that the battery assembled using the ultra-capacity lithium-ion battery cathode material in this example had a battery capacity of 199.2 $mAhg^{-1}$, with the battery capacity retention rate still being up to 99% or more after cycling for 1000 cycles.

Example 5

To prepare the super-capacity lithium-ion battery cathode material in this example, nano-sized $LiNi_{0.5}Mn_{1.5}O_4$ was used to replace the nano-sized lithium iron phosphate in Example 1. The nano-sized $LiNi_{0.5}Mn_{1.5}O_4$ and sucrose were dispersed in ethanol. The resulting mixture was likewise ball-milled to dryness, and then heated to 500° C. and kept at the constant temperature for 2 hours under an inert atmosphere to obtain the super-capacity lithium-ion battery cathode material in this example.

The interface between $LiNi_{0.5}Mn_{1.5}O_4$ and the carbon layer was tested by X-ray photoelectron spectroscopy. The X-ray photoelectron spectroscopy indicated the formation of C—O bonds, confirming that a new interface, that is, a repaired lattice interface, was formed between $LiNi_{0.5}Mn_{1.5}O_4$ and the carbon layer in this example.

The ultra-capacity lithium-ion battery cathode material in this example was assembled into a battery, and the battery was tested by the Maccor M4200 battery test system. The assembling and the test method of the battery were the same as in Example 1, and are not described in detail here. The test results indicated that the battery assembled using the ultra-capacity lithium-ion battery cathode material in this example had a battery capacity of 207.5 $mAhg^{-1}$, with the battery capacity retention rate still being up to 99% or more after cycling for 1000 cycles.

Example 6

For the ultra-capacity lithium-ion battery cathode material in this example, nano-sized $LiFePO_4/LiMn_{0.6}Fe_{0.4}O_4$ having a core-shell structure, with $LiFePO_4$ being the shell layer, was used to replace the nano-sized lithium iron phosphate in Example 1. The prepared lithium iron phosphate shell layer of $LiFePO_4/LiMn_{0.6}Fe_{0.4}O_4$ was 5 nm thick. The $LiFePO_4/LiMn_{0.6}Fe_{0.4}O_4$ nano-sized material with a core-shell structure was prepared by a conventional coating method, which is not specifically limited here.

The preparation method of $LiFePO_4/LiMn_{0.6}Fe_{0.4}O_4$ was as follows:

(1) Ferrous sulfate, phosphoric acid and lithium hydroxide were dissolved in ethylene glycol in a set ratio of 1:1.275:2.7. At the same time, additional ferrous sulfate in an amount of one-tenth of the above ferrous sulfate was dissolved in ethylene glycol.

(2) The first ferrous sulfate solution was added to a three-necked flask with continuous stirring and argon gas protection. After 10 minutes, the phosphoric acid solution was added dropwise, and stirred for 10 minutes. Then, the lithium hydroxide solution was added dropwise, and after 10 minutes, the temperature was raised.

(3) When the temperature was raised to the range of 90-120° C., to the resulting solution was added the second ferrous sulfate solution dropwise. The temperature was continuously raised to 180° C., and the reaction was refluxed for 4 hours. Then the reaction was cooled, and washed under centrifugation, followed by drying in a vacuum drying oven at 80° C.

(4) A certain amount of the product obtained in (3) was mixed with certain amounts of glucose and ascorbic acid, and the mixture was calcined at 650° C. for 6 h. The final product was a lithium iron phosphate-coated lithium iron manganese phosphate material having a carbon coating layer.

The nano-sized $LiFePO_4/LiMn_{0.6}Fe_{0.4}O_4$ and sucrose were dispersed into ethanol. The resulting mixture was likewise ball-milled to dryness, and then heated to 800° C. and kept at the constant temperature for 5 hours under an inert atmosphere to obtain the super-capacity lithium-ion battery cathode material in this example.

The interface between $LiFePO_4/LiMn_{0.6}Fe_{0.4}O_4$ and the carbon layer was tested by X-ray photoelectron spectroscopy. The X-ray photoelectron spectroscopy indicated the formation of C—O bonds, confirming that a new interface, that is, a repaired lattice interface, was formed between $LiFePO_4/LiMn_{0.6}Fe_{0.4}O_4$ and the carbon layer in this example.

The ultra-capacity lithium-ion battery cathode material in this example was assembled into a battery, and the battery was tested by the Maccor M4200 battery test system. The assembling and the test method of the battery were the same as in Example 1, and are not described in detail here.

Figure 12:
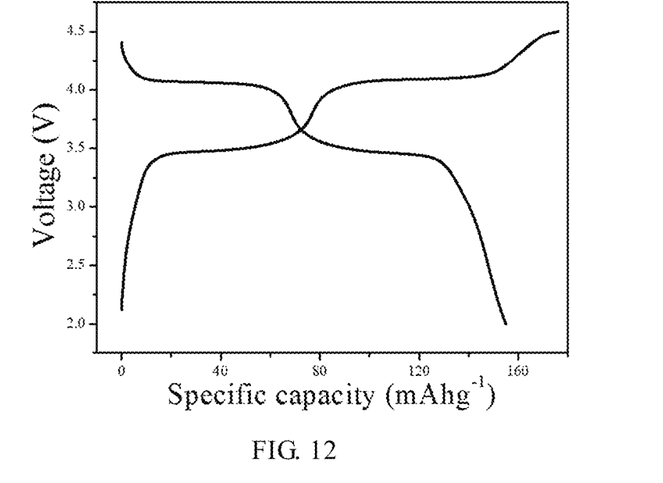
FIG. 12 is a graph showing the charging and discharging curves of a C—O bond-coordinated carbon-coated super-capacity carbon-coated lithium-ion battery cathode material $LiFePO_4/LiMn_{0.6}Fe_{0.4}O_4$ prepared in an embodiment of the present application.

As shown in FIG. 12, the test results indicated that the battery assembled using the ultra-capacity lithium-ion battery cathode material in this example had a battery capacity of 156.3 $mAhg^{-1}$, with the battery capacity retention rate still being up to 99% or more after cycling for 1000 cycles.

Example 7

To prepare the super-capacity lithium-ion battery cathode material in this example, nano-sized $LiCo_{1/3}Mn_{1/3}Ni_{1/3}O_2$ was used to replace the nano-sized lithium iron phosphate in Example 1. The nano-sized $LiCo_{1/3}Mn_{1/3}Ni_{1/3}O_2$ and sucrose were dispersed in ethanol. The resulting mixture was likewise ball-milled to dryness, and then heated to 800° C. and kept at the constant temperature for 5 hours under an inert atmosphere to obtain the super-capacity lithium-ion battery cathode material in this example.

The interface between $LiCo_{1/3}Mn_{1/3}Ni_{1/3}O_2$ and the carbon layer was tested by X-ray photoelectron spectroscopy. The X-ray photoelectron spectroscopy indicated the formation of C—O bonds, confirming that a new interface, that is, a repaired lattice interface, was formed between $LiCo_{1/3}Mn_{1/3}Ni_{1/3}O_2$ and the carbon layer in this example.

The ultra-capacity lithium-ion battery cathode material in this example was assembled into a battery, and the battery was tested by the Maccor M4200 battery test system. The assembling and the test method of the battery were the same as in Example 1, and are not described in detail here. The test results indicated that the battery assembled using the ultra-capacity lithium-ion battery cathode material in this example had a battery capacity of 200.3 $mAhg^{-1}$, with the battery capacity retention rate still being up to 99% or more after cycling for 1000 cycles.

Example 8

To prepare the super-capacity lithium-ion battery cathode material in this example, 1 g of $LiFePO_4$ having an average particle diameter of 42 nm and 0.2 g of glucose were dispersed in 5 mL of ethanol. The resulting mixture was ball-milled to dryness under nitrogen, and then heated to 650° C. and kept at the constant temperature for 6 hours under an inert atmosphere to obtain the super-capacity lithium-ion battery cathode material in this example.

The interface between $LiFePO_4$ and the carbon layer was tested by X-ray photoelectron spectroscopy. The X-ray photoelectron spectroscopy indicated the formation of C—N bonds, confirming that a new interface, that is, a repaired lattice interface, was formed between $LiFePO_4$ and the carbon layer in this example.

The ultra-capacity lithium-ion battery cathode material in this example was assembled into an all-solid lithium battery, and the battery was tested by the Maccor M4200 battery test system. The assembling and the test method of the battery were as follows:

Preparation of solid electrolyte polymer electrolyte membrane: (a) 0.26 g of polyoxyethylene with $Mw=4*10^6$ and 6 g of acetonitrile were placed into a sample bottle, and the mixture was stirred at 60° C. until all the polyoxyethylene was dissolved; (b) 0.046 g of aluminum oxide having a particle diameter of 30 nm was placed into the sample bottle treated in step (a), and the resulting mixture was stirred until the aluminum oxide was uniformly dispersed; (c) 0.0161 g of LiTFSI was placed into the sample bottle treated in step (b), and the resulting mixture was stirred at a speed of 30 rpm, followed by stirring for 24 hours; and (d) the mixture obtained after treatment in step (c) was evenly dropped onto a clean glass slide, and the slide was placed over a heater at 80° C. to evaporate off the acetonitrile solvent to obtain a polymer film.

Preparation of cathode plate: 1 g of the ultra-capacity lithium-ion battery cathode material prepared in this example, 0.2 g of acetylene black conductive nanoparticles with an average particle diameter of 40 nm, and 0.1 g of the organic solid electrolyte were thoroughly mixed, and the mixture was tightly compressed into an electrode plate having a diameter of 0.5 to 2 cm, thus obtaining the cathode plate in this example. Assembling of high-performance all-solid lithium battery for use at high temperatures: the cathode material was cut according to battery model and battery type, the diameter of the cathode plate in this example being 2 cm; the polymer film was cut according to the size of the cathode plate, with the diameter of the polymer film being slightly larger than that of the cathode plate by 0.1 to 0.2 cm; a lithium plate was selected in this example as the anode plate; and the cathode plate, the polymer electrolyte film and the anode plate was compressed in the named order and encapsulated with a battery casing.

Figure 13:
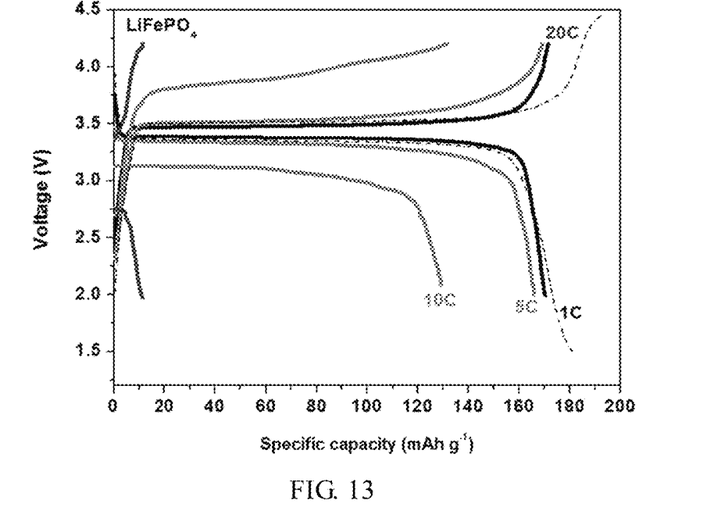
FIG. 13 is a graph showing the charging and discharging curves of an all-solid $LiFePO_4$ lithium-ion battery prepared in an embodiment of the present application, wherein 1 C, 5 C, 1° C., and 20 C respectively represent the charging and discharging curves at 1 C, 5 C, 10 C, and 20 C rate.

The all-solid lithium battery prepared in this example was tested for charging and discharging curves at 100° C. and different rates. As shown in FIG. 13, the test results indicated that at the working temperature of 100° C. and different rates of 1 C, 5 C, 10 C, and 20 C, the capacity was respectively 170.1, 165.6, 129.0, 11.3 mAh/g, suggesting that the all-solid lithium battery prepared in this example had a good working stability.

Example 9

In this example, the transition metals contained in the lithium ion cathode materials were studied. Examples 1-7 respectively demonstrate that the transition metals in the lithium ion cathode materials containing Fe, Mn, Co, Ni, etc., such as $LiFePO_4$, $LiMn_2O_4$, $LiNi_{0.5}Mn_{1.5}O_4$, and $LiCo_{1/3}Mn_{1/3}Ni_{1/3}O_2$, were capable of forming transition metal-X—C chemical bonds with carbon, wherein X is N, O or S, such that the carbon was stably coated on the surface of the cathode materials.

It has been verified by calculation that in the transition metal-containing lithium-ion cathode materials, due to damage of the transition metal-O structure on the surface of the cathode materials, transition metal ions were exposed at the terminal, as shown in FIG. 7 panel a. After being coated or modified by carbon in the present application, a structure of transition metal-X—C chemical bonds was generated at the terminal of the transition metal ions, as shown in FIG. 7 panel b. Such a structure would generate excess Li storage positions on the surface. A typical structure was $LiMPO_4$, wherein M is the transition metal Fe, Mn or Co.

In this example, the average voltage at various sites of $LiFePO_4$, $LiCoPO_4$, $LiMnPO_4$, or $LiFe_{0.5}Mn_{0.5}PO_4$ not coated with carbon, and the average voltage at various sites of $LiFePO_4$, $LiCoPO_4$, $LiMnPO_4$, or $LiFe_{0.5}Mn_{0.5}PO_4$ coated with carbon and forming transition metal M-X—C chemical bonds were respectively calculated. The sites tested were respectively the S1, S2, S3 and S4 sites shown in FIG. 14. The results are shown in Table 1, wherein $LiMPO_4$—N represents a conventional $LiMPO_4$, that is, $LiFePO_4$, $LiCoPO_4$, $LiMnPO_4$, or $LiFe_{0.5}Mn_{0.5}PO_4$ not coated with carbon; and $LiMPO_4$-E represents ultra-capacity $LiMPO_4$, that is, the super-capacity lithium-ion battery cathode material coated with carbon in this example.

The calculation method employed in this example was as follows:

The ultra-capacity study was implemented by density functional theory calculations, using VASP (Vienna Ab-initio Simulation Package) software to optimize the geometry and electronic structure of each system. The calculations employed the PBE functional of generalized gradient approximation (abbreviated GGA) to describe the electron exchange correlation potential. The electron wave function employed the projector augmented wave (abbreviated PAW), the plane wave cutoff energy was 400 eV, and the Brillouin zone employed the Monkhorst-Pack method. The convergence criterion of the self-consistent field loop was $10^{-5}$ eV, and the geometry was fully optimized until the value of the residual force on the atom was less than 0.01 eV/A, at which point the convergence was completed.

Employing the Nernst relationship, the lithium (Li) average voltage of the unit cell structure was calculated by the following formula (1):

$$V(x) = -\Delta G/(xF) \quad (1)$$

In formula (1), F is Faraday constant, x is the number of intercalated Li atoms, and $\Delta G$ is the amount of change in Gibbs free energy.

The amount of change in Gibbs free energy $\Delta G$ was calculated by the following formula (2):

$$\Delta G = E(LiMPO_4) - \mu_{Li} - E(MPO_4) \quad (2)$$

In formula (2), M represents a transition metal, $\mu_{Li}$ represents the chemical potential of Li, and $E(LiMPO_4)$ and $E(MPO_4)$ are the energy of the $LiMPO_4$ or $MPO_4$ crystal structure, respectively.

TABLE 1

| Voltage of lithium at different sites on the surface of the cathode material | | | | |
|---|---|---|---|---|
| | S1 | S2 | S3 | S4 |
| $LiFePO_4$-N | 3.46 | 2.79 | −0.13 | −0.11 |
| $LiFePO_4$-E | 3.46 | 3.02 | 3.01 | 2.68 |
| $LiMnPO_4$-N | 4.00 | 3.36 | −0.17 | −0.23 |
| $LiMnPO_4$-E | 4.00 | 3.59 | 3.50 | 2.69 |
| $LiCoPO_4$-N | 4.59 | 4.06 | −0.23 | −0.37 |
| $LiCoPO_4$-E | 4.60 | 4.38 | 3.40 | 2.71 |
| $LiFe_{0.5}Mn_{0.5}PO_4$-N | 3.68 | 3.33 | −0.15 | −0.19 |
| $LiFe_{0.5}Mn_{0.5}PO_4$-E | 3.68 | 3.41 | 3.02 | 2.68 |
| $LiFe_{0.5}Co_{0.5}PO_4$-N | 3.99 | 4.00 | −0.10 | −0.22 |
| $LiFe_{0.5}Co_{0.5}PO_4$-E | 4.01 | 4.04 | 3.09 | 2.74 |

Figure 14:
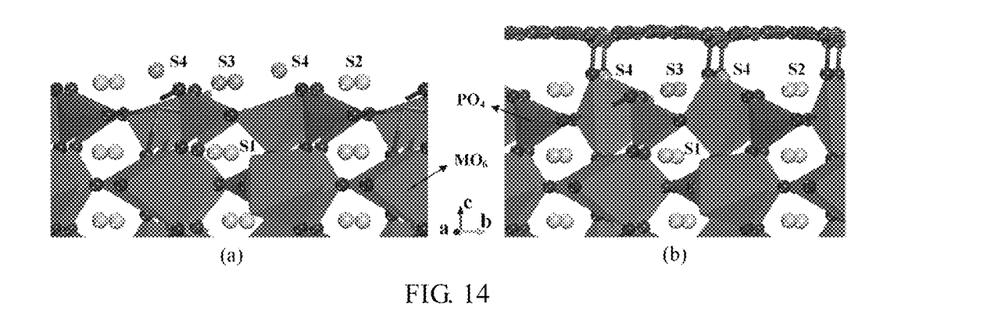
FIG. 14 is a schematic structural view showing storage of lithium ions before and after lattice repair on a surface of a lithium ion cathode material in an embodiment of the present application, wherein panel a is a schematic structural diagram before repair, and panel b is a schematic structural diagram after repair.

The results in Table 1 show the voltages at different lithium storage sites for $LiMPO_4$ (M=Fe, Co, Mn) and their mixed structures ($LFeMnPO_4$, $LiFeCoPO_4$) in the absence of ultra-capacity lithium storage interface coating (M-X—C). First, at the S1 site, that is, the site inside the $LiMPO_4$, structure, the voltage of lithium did not change, regardless of whether or not $LiMPO_4$ had a super-capacity carbon coating structure, suggesting that the super-capacity carbon coating did not have any influence on the property of lithium storage inside $LiMPO_4$; at the S2 site with half of the lithium ions on the surface of $LiMPO_4$, the voltage of lithium slightly increased after ultra-capacity carbon coating of $LiMPO_4$, suggesting that the lithium voltage on the surface was slightly affected after carbon coating; at the S3 site with full lithium ions on the surface of $LiMPO_4$, the voltage of lithium was small and negative in the absence of carbon coating, and the voltage of lithium increased greatly and came close to the bulk voltage after ultra-capacity carbon coating, suggesting that additional, new lithium storage sites were present on the surface of the carbon-coated, interfacially repaired $LiMPO_4$ in the present application, which increased the capacity of $LiMPO_4$; and at the S4 site, which was the site originally not capable of lithium storage on the surface of $LiMPO_4$, the voltage of lithium was 2.6 to 2.8 after carbon coating, also suggesting that additional, new lithium storage sites were present on the surface of $LiMPO_4$ after ultra-capacity carbon coating in the present application, which increased the capacity of $LiMPO_4$. In summary, only half of Li could be stored on the surface of $LiMPO_4$. The voltage of this portion of Li was close to the bulk voltage and could be utilized. When the surface was filled with Li, the additional half portion of Li exhibited little or no voltage and thus could not be utilized, as shown in FIG. 14 panel a. However, the ultra-capacity $LiMPO_4$-E, after incorporating a carbon-oxygen structure, formed a C—O-transition metal interfacial structure on the surface. Such a structure allowed the surface to be filled with Li, with the voltage of Li coming close to the bulk voltage, such that the surface had an additional 50% of Li. At the same time, a portion of Li could be stored in the C—O-transition metal structure. Such a portion of Li had a relatively fixed voltage in the range of 2.6 to 2.8, and could also be utilized, as shown in FIG. 14 panel b. Therefore, any lithium ion cathode materials capable of forming transition metal-X—C chemical bonds would achieve the ultra-capacity effect in the present application. Besides the lithium ion cathode materials containing Fe, Mn, Co, or Ni transition metal in Example 1-7, conventional lithium ion cathode materials containing V, Ti, Mo or Cu transition metal would likewise form transition-X—C chemical bonds, such that the cathode materials would be capable of storing more Li atoms.

The above is a further detailed description of the present application in conjunction with specific embodiments, but the specific implementation of the present application is not to be construed to be limited thereto. It will be apparent to those skilled in the art that simple derivations or substitutions could be made without departing from the concept of the present invention, and such derivations or substitutions should be construed as falling within the scope of protection of the present application.

The invention claimed is:

1. A lithium-ion battery cathode material, composed of a transition metal-containing lithium-ion cathode material and carbon coated on a surface of the transition metal-containing lithium-ion cathode material,
    wherein the transition metal-containing lithium-ion cathode material is of a core-shell structure, in which an inner core is a cathode active material and an outer shell is lithium iron phosphate, a surface of the lithium iron phosphate outer shell is coated with carbon, and the carbon is stably coated on the surface of the lithium iron phosphate outer shell via Fe—X—C chemical bonds, and wherein C is SP3 hybridized and/or SP2 hybridized, and X is at least one of N, O and S;
    wherein a thickness of the lithium iron phosphate outer shell is 1-100 nm, wherein a battery capacity of a battery using the coated cathode material with the Fe—X—C chemical bonds is higher than a theoretical capacity of a battery using same cathode material which is not coated with the Fe—X—C chemical bonds;
    wherein the cathode active material is at least one of a phosphate transition metal lithium cathode material, a silicate transition metal lithium cathode material, a borate transition metal lithium cathode material, a fluorinated sulfate transition metal lithium cathode material and a transition metal oxide lithium cathode material;
    wherein the transition metal of the cathode active material is at least one of Fe, Mn, Co, Ni, V, Ti, Mo and Cu;
    the transition metal oxide lithium cathode material is $Li_{1+y}(M_aZ_bY_c)_{1-y}O_2$ and/or $LiMn_{2-a}M'_aZ'_bO_4$;
    wherein in the $Li_{1+y}(M_aZ_bY_c)_{1-y}O_2$, M, Z and Y is non-repetitiously selected from one of Ni, Mn, Co, V, Ti, Mo and Cu, $0\leq a\leq 1$, $0\leq b\leq 1$, $0\leq c\leq 1$, and $a+b+c=1$, $0\leq y\leq 1$, and
    in the $LiMn_{2-a}M'_aZ'_bO_4$, M' and Z' is non-repetitiously selected from one of Cr, Co, Ni, Cu, Fe, Mo, Ti and V, $0\leq a'\leq 2$, and $0\leq b'\leq 2$.

2. A battery comprising the lithium-ion battery cathode material according to claim 1.

3. The battery according to claim 2, wherein the battery is a lithium-ion battery and is prepared by a method comprising: preparing at least one of the lithium-ion battery cathode material into a suspension, and then spray drying the suspension at a temperature of 25-220° C. to form a cathode secondary particle material of 200 nm to 100 μm for use to prepare the lithium-ion battery.

4. The battery according to claim 2, wherein the battery is an all-solid lithium battery.

5. The battery according to claim 4, wherein a cathode plate of the all-solid lithium battery is made of the lithium-ion battery cathode material, a conductive material and a solid electrolyte, the conductive material being at least one of a conductive nanoparticle, a conductive polymer, a conductive nanotube and a conductive nanosheet, the solid electrolyte being at least one of an inorganic solid electrolyte, an organic solid electrolyte, and an organic/inorganic composite solid electrolyte, and an anode of the all-solid lithium battery being of a carbon-based material, an oxide-based material, a sulfide-based material, lithium metal or a lithium alloy.

6. Use of the lithium-ion battery cathode material according to claim 1 in a lithium-ion battery, comprising preparing the lithium-ion battery cathode material into a cathode particle material of 5 nm to 100 μm, in which the carbon atoms on the surface of the lithium-ion battery material are connected to each other or at least in slight contact with each other to form a thermally stable, electron-conducting and lithium ion-conducting network structure.

7. A method for preparing a lithium-ion battery cathode material according to claim 1, comprising:
    preparing an oxygen-containing, sulfur-containing or nitrogen-containing carbon source in a solvent to get a carbon source solution,
    mixing a nano-sized transition metal-containing lithium-ion cathode material with the carbon source solution to get a mixture, wherein the transition metal-containing lithium-ion cathode material is of a core-shell structure, in which an inner core is a cathode active material and an outer shell is lithium iron phosphate,
    milling the mixture in a ball mill until the solvent completely volatilizes to get a dried product,
    heating the dried product to a temperature in the range of 500-1000° C. under an inert atmosphere and keeping the product at the temperature for 2-12 hours, followed by natural cooling to obtain the lithium-ion battery cathode material;
    wherein the oxygen-containing carbon source being at least one of citric acid, glucose and sucrose, the sulfur-containing carbon source being thiol and/or thiophene, the nitrogen-containing carbon source being an amino acid and/or melamine; the concentration of the carbon source solution being 0.1-2 mol/L; and the solvent of the carbon source solution being at least one of water, isopropyl alcohol, ethanol, acetone, and ethylene glycol.

* * * * *